(12) United States Patent
Heino et al.

(10) Patent No.: US 7,831,345 B2
(45) Date of Patent: Nov. 9, 2010

(54) METHOD OF DRIVING PLURALITY OF MINE VEHICLES IN MINE, AND TRANSPORT SYSTEM

(75) Inventors: Timo Heino, Naantali (FI); Pekka Vauramo, Masku (FI)

(73) Assignee: Sandvik Mining and Construction Oy, Tampere (FI)

( * ) Notice: Subject to any disclaimer, the term of this patent is extended or adjusted under 35 U.S.C. 154(b) by 7 days.

(21) Appl. No.: 11/992,953

(22) PCT Filed: Oct. 2, 2006

(86) PCT No.: PCT/FI2006/050421

§ 371 (c)(1),
(2), (4) Date: May 30, 2008

(87) PCT Pub. No.: WO2007/039669

PCT Pub. Date: Apr. 12, 2007

(65) Prior Publication Data

US 2009/0118889 A1    May 7, 2009

(30) Foreign Application Priority Data

Oct. 3, 2005    (FI)    ................... 20055528

(51) Int. Cl.
  *B62D 1/28*    (2006.01)
  *E21C 41/00*    (2006.01)
  *G05D 1/02*    (2006.01)
  *B62D 12/02*    (2006.01)

(52) U.S. Cl. ................ 701/23; 701/2; 701/17; 701/24; 701/41; 318/587; 299/1.9

(58) Field of Classification Search ............. 180/167; 340/435; 701/2, 24, 301

See application file for complete search history.

(56) References Cited

U.S. PATENT DOCUMENTS

| 4,986,384 | A | | 1/1991 | Okamoto et al. |
| 5,295,551 | A | * | 3/1994 | Sukonick ................. 180/167 |
| 5,469,356 | A | * | 11/1995 | Hawkins et al. ............. 701/48 |
| 5,835,880 | A | * | 11/1998 | Gan et al. .................. 701/205 |
| 5,838,562 | A | * | 11/1998 | Gudat et al. ............... 701/213 |
| 5,999,865 | A | * | 12/1999 | Bloomquist et al. .......... 701/25 |
| 6,044,312 | A | * | 3/2000 | Sudo et al. ................. 701/25 |
| 6,148,255 | A | | 11/2000 | Van Der Lely |
| 6,169,940 | B1 | * | 1/2001 | Jitsukata et al. ............ 701/23 |
| 6,223,110 | B1 | * | 4/2001 | Rowe et al. ................ 701/50 |
| 6,226,572 | B1 | * | 5/2001 | Tojima et al. .............. 701/50 |

(Continued)

FOREIGN PATENT DOCUMENTS

JP    2000-311299    11/2000

*Primary Examiner*—Khoi Tran
*Assistant Examiner*—Dale Moyer
(74) *Attorney, Agent, or Firm*—Drinker Biddle & Reath LLP

(57) ABSTRACT

A method of driving mine vehicles in a mine, and a transport system. A plurality of mine vehicles is arranged in succession and driven in convoy between working areas. A master vehicle in the convoy is driven manually, and slave vehicles follow the master, provided with no mechanical connection. In the working areas, the convoy is disassembled, since single vehicles are each driven separately. When assigned tasks in the working areas have been completed, the vehicles are reassembled into a convoy so as to be driven to a next working area.

6 Claims, 3 Drawing Sheets

U.S. PATENT DOCUMENTS

| | | | |
|---|---|---|---|
| 6,246,932 B1 * | 6/2001 | Kageyama et al. | 701/24 |
| 6,285,929 B1 | 9/2001 | Hashimoto | |
| 6,313,758 B1 * | 11/2001 | Kobayashi | 340/932 |
| 2002/0176605 A1 * | 11/2002 | Stafsudd et al. | 382/106 |
| 2004/0040792 A1 * | 3/2004 | Uranaka et al. | 187/382 |
| 2006/0229804 A1 * | 10/2006 | Schmidt et al. | 701/205 |

* cited by examiner

US 7,831,345 B2

METHOD OF DRIVING PLURALITY OF MINE VEHICLES IN MINE, AND TRANSPORT SYSTEM

CROSS REFERENCE TO RELATED APPLICATIONS

This application is the National Stage of International Application No. PCT/FI2006/050421, filed Oct. 2, 2006, and claims benefit of Finnish Application No. 20055528, filed Oct. 3, 2005.

BACKGROUND OF THE INVENTION

The invention relates to a method of driving mine vehicles in a mine, the method comprising: assembling mine vehicles into a convoy comprising a plurality of mine vehicles in succession with no mechanical connection therebetween; driving each mine vehicle in the convoy by means of control means provided in each vehicle; appointing one of the mine vehicles in the convoy as a master vehicle and the rest of the mine vehicles in the convoy as slave vehicles; driving the master vehicle in the convoy manually, controlled by an operator; controlling the slave vehicles in the convoy automatically on the basis of a route traveled by the master vehicle; and monitoring the distance between two successive vehicles and adjusting the travelling speed of the vehicles in order to prevent collisions.

The invention further relates to a transport system for mines, comprising: at least one convoy comprising a plurality of mine vehicles arranged in succession with no mechanical connection therebetween; control means in each mine vehicle for driving the vehicles independently, controlled by an operator and by a control unit of the mine vehicle; at least one control unit for the transport system; at least one data communications link between the control units; and wherein as a first vehicle in the convoy, a master vehicle is provided which is arranged to be driven manually, controlled by the operator; and further, wherein slave vehicles behind the master vehicle are arranged to follow a route taken by the master vehicle, automatically and controlled by the control unit; the transport system comprising at least a first working area and a second working area as well as a route therebetween.

Various vehicles may be transferred from one place to another by driving them in convoy, i.e. as in a line comprising a plurality of vehicles in succession. If only one route is used for the convoy to travel back and forth, it is necessary to be able to change the direction of travel of the convoy. In such a case, a turning place has to be provided wherein the convoy can turn around in order to change its direction of travel. Alternatively, each vehicle in the convoy has to be drivable in two directions. Excavating such turning places e.g. in underground mines incurs considerable additional costs. Furthermore, two-way vehicles are more complex and expensive than one-way vehicles. In view of the aforementioned limitations, driving in convoys is difficult to apply to mines.

BRIEF DESCRIPTION OF THE INVENTION

An object of the present invention is to provide a novel and improved method of driving mine vehicles in convoy, and a novel and improved transport system for mines.

The method according to the invention is characterized by driving the convoy between at least a first working area and a second working area in accordance with the following working cycle: loading the vehicles with rock material; assembling the mine vehicles in the first working area into a convoy and driving the convoy to the second working area; disassembling the convoy in the second working area; driving each single mine vehicle in the second working area separately in order to unload the rock material at an unloading site; assembling the mine vehicles into a convoy after unloading; driving the convoy to the first working area; disassembling the convoy in the first working area; and driving in the first working area each single mine vehicle separately at a loading site in order to load rock material.

The system of the invention is characterized in that the mine vehicles are arranged to be driven in convoy between a loading site residing in the second working area and an unloading site residing in the first working area; and in order to load and unload rock material, each single mine vehicle is arranged to be driven in the working area separately, independently of the rest of the mine vehicles in the convoy.

An idea of the invention is that a plurality of mine vehicles is arranged in succession and driven in convoy along a route provided in a mine between two or more working areas. In the working areas, the convoy is disassembled such that each mine vehicle is driven substantially irrespectively of the rest of the mine vehicles in the convoy. After all necessary driving and tasks in a working area have been completed, the mine vehicles may be reassembled into a convoy and driven to the next working area.

An advantage of the invention is that it is relatively simple to arrange mine vehicles to be transferred in convoys between working areas. Further, since the convoy is disassembled in the working area and each mine vehicle is moved separately therein, it is not particularly difficult to control and manage the mine vehicles in the working areas either. In addition, the transport system according to the invention does not necessitate any fixed changes to be made in a mine, so it is simple and quick to put to use.

An idea of an embodiment of the invention is to drive in at least one working area mine vehicles of a convoy manned. In such a case, either the operator who drove the master vehicle in the convoy or, alternatively, one or more of the operators working in the working area, disassemble(s) the convoy and execute(s) tasks assigned to the mine vehicles by controlling the mine vehicles from a control station provided therein. Finally, the operator further arranges the mining vehicles in succession and assembles them into a convoy. When mine vehicles are driven manned in a working area, no complex control systems nor fixed infrastructure are necessary for controlling the vehicles. Furthermore, this allows also other vehicles and even people to move in the working area since the mine vehicle is controlled by the operator.

An idea of an embodiment of the invention is that the mine vehicles in a convoy are arranged in succession in a random order. In such a case, the vehicles become more flexible and easier to handle in the working area.

An idea of an embodiment of the invention is that a convoy comprises two or more mine vehicles that have different constructions. The mine vehicles in the convoy may differ e.g. in type, properties and dimensions. Consequently, different already existing mine vehicles may also be quite freely included in a convoy.

An idea of an embodiment of the invention is that in one working area, all mine vehicles in a convoy are assigned a substantially similar task, such as loading or unloading.

An idea of an embodiment of the invention is that a convoy comprises a plurality of transport vehicles provided with a dump box for transporting rock material. At a loading site, rock material is loaded to the dump box of each transport vehicle, whereafter the transport vehicles are assembled into a convoy and driven in convoy to a working area provided with an unloading site. Each mine vehicle may be separately taken to the unloading site by driving it in reverse, and then the rock material is dumped from the dump box. In such a solution, each transport vehicle is equipped with a rear-dump dump box, whose structure is simpler than that of a side-dump dump box.

An idea of an embodiment of the invention is that each mine vehicle in a convoy is equipped with one or more reading devices for observing the environment of the vehicle. The reading device may be e.g. a laser scanner. The reading device may be used for establishing surface shapes surrounding a route, such as the wall profile of a tunnel. Each mine vehicle may deliver profile information obtained by the reading device to the control system of the transport system, which, on the basis of the profile information, may determine the location of each mine vehicle in the convoy. The control system may further carry out collision examination and, on the basis thereof, adjust the speed of the slave vehicles such that the slave vehicles do not collide with one another or with the master vehicle. The reading device used for observing the environment, such as a laser scanner, may also be utilized in collision examination.

BRIEF DESCRIPTION OF THE FIGURES

Some embodiments of the invention are described in closer detail in the accompanying drawings, in which FIG. 1 schematically shows a mine vehicle which may be used for assembling a convoy by arranging a plurality of such vehicles in succession, FIG. 2 schematically shows a convoy comprising mine vehicles, FIG. 3 schematically shows a transport system for mines according to the invention, and FIG. 4 schematically shows some possibilities for handling mine vehicles in a convoy in a working area.

For the sake of clarity, the figures show some embodiments of the invention in a simplified manner. In the figures, like reference numbers identify like elements.

DETAILED DESCRIPTION OF SOME EMBODIMENTS OF THE INVENTION

Figure 1:
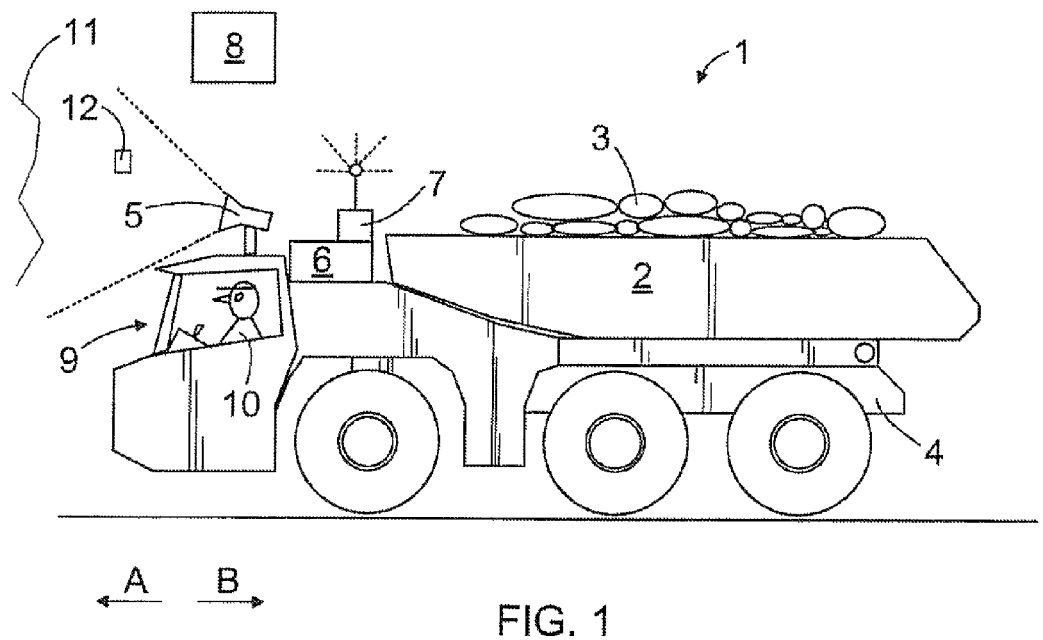

FIG. 1 shows a mine vehicle 1 which, in this case, is a transport vehicle equipped with a dump box 2, which may be constructed so as to enable rock material 3, such as blocks of rock, to be loaded thereto. The dump box 2 may be articulated with respect to a chassis 4 of the transport vehicle 1 such that it may be dumped behind the mine vehicle 1. Such a mine vehicle 1 has one main direction of travel A but, of course, it may be reversed short distances in the opposite direction B. The mine vehicle 1 may be provided with a navigation system by means of which it may determine its location in a mine. The navigation system may comprise one or more reading devices 5, such as a laser scanner. The navigation system may further comprise a gyroscope and other measuring devices for measuring location and direction. Further, the mine vehicle 1 may comprise a control unit 6 and, further, a data communication unit 7 to enable the control unit 6 to communicate with a control unit 8 of the transport system. The mine vehicle 1 is also provided with a control station 9, such as a control cabin or a control deck, to enable the vehicle to be driven manually. The control station 9 is provided with all necessary control elements for controlling the mine vehicle 1. Consequently, the mine vehicle 1 may alternatively be controlled either manned, by an operator 10, or in a remote-controlled manner, by means of control commands delivered to the control unit 6.

A third possibility is that the mine vehicle 1 is driven completely automatically, controlled by its own control unit 6 or by its own control unit 6 and the control unit 8 of the transport system in cooperation.

For automatic drive, the control unit 8 of the transport system may be provided with an electronic map having the tunnels, drivable routes and the surface shapes 11 of the walls along the routes in a mine stored therein. A reading device 5 provided in the mine vehicle 1 may read the surface of a rock wall. The control unit 6 or 8 may compare the measured surface shape information with the surface shape information defined in the electronic map, which enables the accurate location of the mine vehicle 1 in the mine to be determined and thus any error occurred in the positioning based on dead reckoning to be corrected. Such an arrangement does not require the mine to be provided with fixed infrastructure. However, the mine may be provided with identifiers 12 at predetermined places on the basis of which the location of the mine vehicle 1 may be determined. The location determination executed in the control units 6, 8 may be utilized both in automatic drive and in manual drive carried out by an operator.

Figure 2:
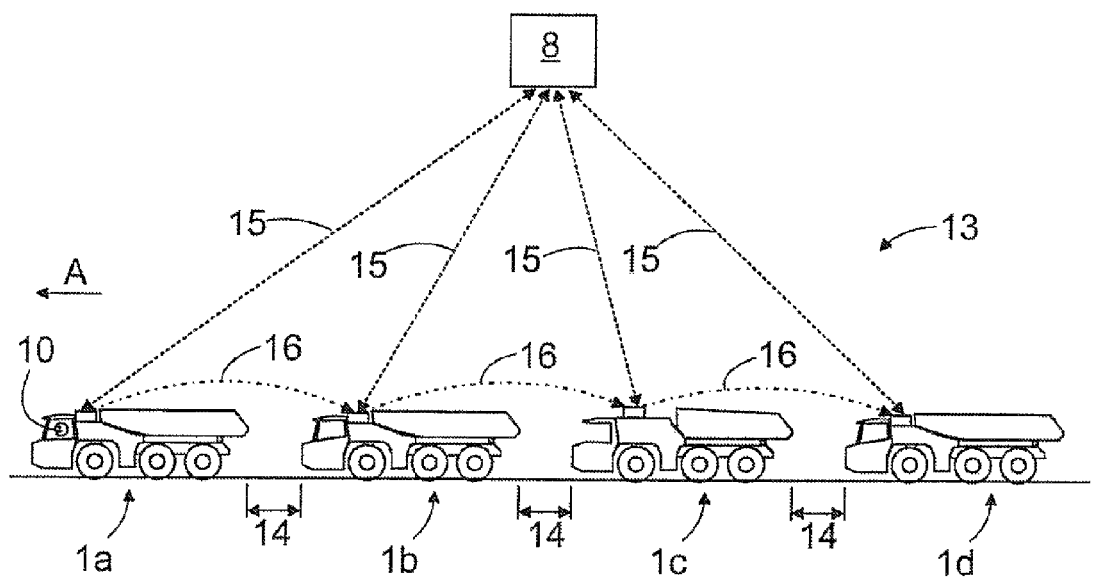

FIG. 2 shows a convoy 13 comprising a plurality of mine vehicles 1, in this case four vehicles 1a to 1d, arranged in succession. No mechanical connection is provided between the vehicles in the convoy 13 but they are driven such that a predetermined distance 14 is always kept between two successive vehicles. In order to alleviate speed adjustment, the distance 14 may comprise a range within which the distance is to be kept substantially continuously. The first vehicle 1a in the convoy 13 may be a master vehicle which is driven either manned or in a teleoperated manner, controlled by the operator 10. The rest of the vehicles 1b to 1d in the convoy 13 are slave vehicles which follow the master vehicle 1a. The slave vehicles 1b to 1d are controlled automatically by means of the control unit 6 provided therein. Via a communications link 15, the control units 6 of each mine vehicle may be connected with the control unit 8 of the transport system. When the master vehicle 1a conducts a control action, i.e. makes a steering movement, stops or changes its speed, information about this is delivered via the data communications link 15 to the control unit 8, which may forward the control command to the control units of the slave vehicles 1b to 1d. The control command may include location information on where in the mine the master vehicle made the control action and what the control action was like. If, for example, a block of rock lies in a route and the master goes around it, the slaves may conduct a similar steering movement when they, one by one, arrive at the obstacle. It is further possible that the reading devices 5 provided in the slave vehicles 1b to 1d are used for monitoring the control actions of a preceding vehicle. Since the convoy 13 may be driven among other traffic and since it comprises unmanned slave vehicles, the transport system must be provided with a security system for emergency stopping the convoy. Emergency messages and the like may be transmitted via a data communications link 16 provided between the vehicles or they may be delivered through the control unit 8 of the transport system by using the data communications link 15.

Figure 3:
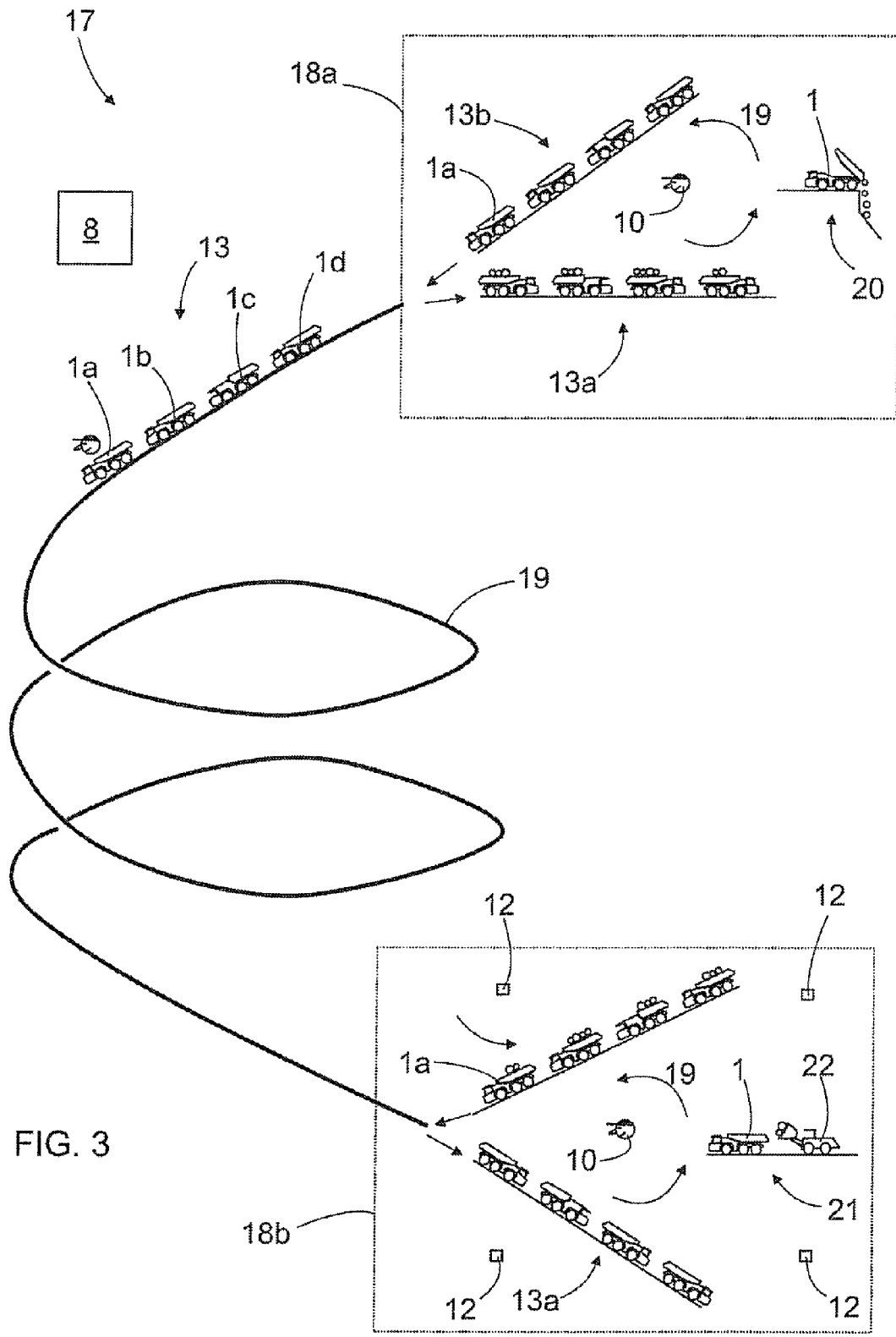

FIG. 3 illustrates how a convoy 13 is operated in a mine 17, which is typically an underground mine. The mine 17 may be provided with a first working area 18a and a second working area 18b between which the convoy 13 may be driven along a mine gallery 19 or the like. The working areas 18 may comprise a place whereto the convoy 13 is driven so as to wait for each mine vehicle 1 in turn to perform a task assigned thereto in the working area 18. In the figure, arrows 19 depict the work cycle taking place in the working area 18a. From a load-bearing convoy 13a driven to the first working area 18a, one vehicle at a time or possibly a plurality of vehicles simultaneously is/are driven to an unloading site 20 where the mine vehicles 1 dump their load. From the unloading site 20, the mine vehicles 1 are again driven into a successive arrangement such that the emptied vehicles form a new convoy 13b. The mine vehicles 1a to 1d may be arranged in the original order, or the order may be random. The first vehicle 1a in the order always becomes the master vehicle. Next, an operator 10 enters the control station 9 of the master vehicle 1a and starts driving the convoy 13 towards the second working area 18b. Alternatively, a teleoperation mode is switched on and the convoy starts to be driven remote-controllably, controlled e.g. from a control room, on the basis of video picture and measurement data.

In the second working area 18b, the empty convoy 13a waits for the convoy to be disassembled, i.e. for each mine vehicle 1 at a time or possibly a plurality of mine vehicles 1 simultaneously being driven to a loading site 21 where rock material is loaded to the dump box of the mine vehicles 1 e.g. by a loader vehicle 22. From the loading site 21, the mine vehicles 1 are driven into a successive arrangement so that they form a loaded convoy 13a which is driven, controlled by the operator 10, to the first working area 18a for unloading. The mine vehicles 1 may be driven between the first working area 18a and the second working area 18b continuously, in which case the above-described phases are repeated. Naturally, other vehicles may be used in lieu of transport vehicles but then, of course, the tasks to be performed in the working areas 18 differ from those of loading and unloading. It is also possible that the number of working areas 18 is more than two and that the mine vehicles do not constantly take the same route but the route of the convoy 13 may change as necessary.

FIG. 3 further shows that some working area 18, the working area 18b in the figure, is provided with a plurality of identifiers 12, radio beacons or some other fixed infrastructure, which enable the transport system to be controlled completely automatically in the working area 18b. In such a case, however, the working area 18b has to be closed to devices not included in the system.

Figure 4:
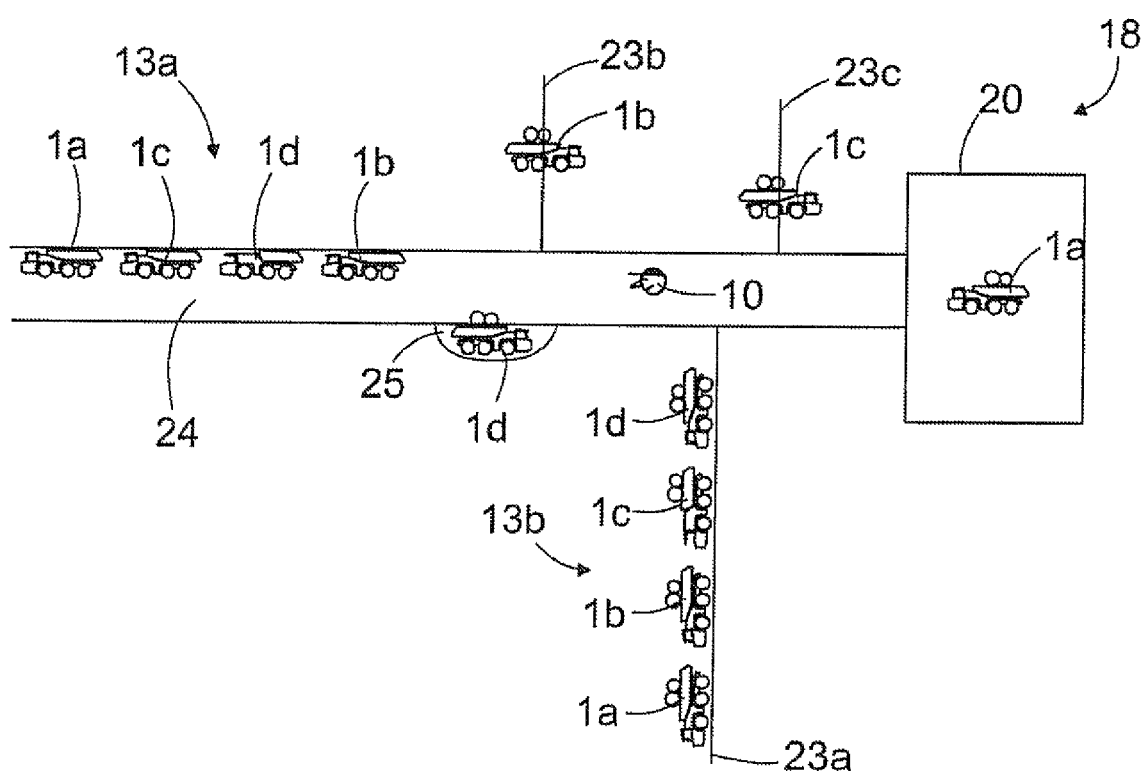

FIG. 4 shows a working area 18 and a convoy 13b therein that has been driven to a production gallery 23a or the like residing in the vicinity of the unloading site 20. Alternatively, the convoy 13b is disassembled such that the mine vehicles 1 are driven to several different production galleries 23b and 23c or to an expansion 25 or the like provided on a route 24. Each mine vehicle 1a to 1d is driven independently of other vehicles to the unloading site 20, emptied, and then driven in succession to the route 24 so as to form a convoy 13a. When the mine vehicles 1 are driven to the production galleries 23, expansions 25 or the like, they do not block the traffic on the route 24. In such a case, the working area 18 does not have to be provided with additional space excavated for the convoy 13.

It is also possible that the convoy to be formed may also comprise other mine vehicles than transport vehicles equipped with a dump box for transporting rock material. For instance, the convoy may comprise several transport vehicles and one or more rock drilling rigs. Moreover, it is possible that the master vehicle is not provided with a dump box.

In some cases, the features disclosed in the present application may be used as such, irrespectively of other features. On the other hand, the features disclosed in the present application may be combined as desired in order to provide various combinations.

The drawings and the related description are only intended to illustrate the idea of the invention. The details of the invention may vary within the scope of the claims.

The invention claimed is:

1. A method of driving mine vehicles in a mine, the method comprising:
    assembling mine vehicles into a convoy comprising a plurality of mine vehicles in succession with no mechanical connection therebetween;
    driving each mine vehicle in the convoy by means of control means provided in each vehicle;
    appointing one of the mine vehicles in the convoy as a master vehicle and the rest of the mine vehicles in the convoy as slave vehicles;
    driving the master vehicle in the convoy manually, controlled by an operator,
    controlling the slave vehicles in the convoy automatically on the basis of a route traveled by the master vehicle,
    monitoring the distance between two successive vehicles and adjusting the travelling speed of the vehicles in order to prevent collisions; and
    driving the convoy between at least a first working area and a second working area in accordance with the following working cycle:
    loading the vehicles with rock material,
    assembling the mine vehicles in the first working area into a convoy and driving the convoy to the second working area,
    disassembling the convoy in the second working area,
    driving each single mine vehicle in the second working area separately in order to unload the rock material at an unloading site,
    assembling the mine vehicles into a convoy after unloading,
    driving the convoy to the first working area,
    disassembling the convoy in the first working area,
    driving in the first working area each single mine vehicle separately at a loading site in order to load rock material, and
    driving the convoy between the loading site and the unloading site substantially continuously.

2. A method as claimed in claim 1, comprising
    driving each mine vehicle manned in at least one working area at least in one of the following situations: disassembling the convoy, performing tasks, reassembling the mine vehicles into a convoy.

3. A method as claimed in claim 1, comprising
    arranging the mine vehicles in the convoy in a random order in the convoy.

4. A method as claimed in claim 1, comprising
    forming a convoy from a plurality of transport vehicles provided with a dump box for transporting rock material,
    loading rock material to the dump box of the transport vehicles at the loading site residing in the second working area,
    reversing, in the first working area, each transport vehicle one by one to the unloading site and dumping the rock material from the dump box, and
    driving the convoy between the loading site and the unloading site substantially continuously.

5. A method of driving mine vehicles in a mine, the method comprising:
    assembling mine vehicles into a convoy comprising a plurality of mine vehicles in succession with no mechanical connection therebetween;

driving each mine vehicle in the convoy by means of control means provided in each vehicle;

appointing one of the mine vehicles in the convoy as a master vehicle and the rest of the mine vehicles in the convoy as slave vehicles;

driving the master vehicle in the convoy manually, controlled by an operator, controlling the slave vehicles in the convoy automatically on the basis of a route traveled by the master vehicle, monitoring the distance between two successive vehicles and adjusting the travelling speed of the vehicles in order to prevent collisions; and driving the convoy between at least a first working area and a second working area in accordance with the following working cycle:

loading the vehicles with rock material, assembling the mine vehicles in the first working area into a convoy and driving the convoy to the second working area, disassembling the convoy in the second working area, driving each single mine vehicle in the second working area separately in order to unload the rock material at an unloading site, assembling the mine vehicles into a convoy after unloading, driving the convoy to the first working area, disassembling the convoy in the first working area, driving in the first working area each single mine vehicle separately at a loading site in order to load rock material, and driving the convoy between the loading site and the unloading site substantially continuously, wherein the vehicles driven in the mine are a limited and selected group of mine vehicles.

6. A method of driving mine vehicles in a mine, the method comprising:

assembling mine vehicles into a convoy comprising a plurality of mine vehicles in succession with no mechanical connection therebetween;

driving each mine vehicle in the convoy by means of control means provided in each vehicle;

appointing one of the mine vehicles in the convoy as a master vehicle and the rest of the mine vehicles in the convoy as slave vehicles;

driving the master vehicle in the convoy manually, controlled by an operator, controlling the slave vehicles in the convoy automatically on the basis of a route traveled by the master vehicle, monitoring the distance between two successive vehicles and adjusting the travelling speed of the vehicles in order to prevent collisions; and driving the convoy between at least a first working area and a second working area in accordance with the following working cycle:

loading the vehicles with rock material, assembling the mine vehicles in the first working area into a convoy and driving the convoy to the second working area, disassembling the convoy in the second working area, driving each single mine vehicle in the second working area separately in order to unload the rock material at an unloading site, assembling the mine vehicles into a convoy after unloading, driving the convoy to the first working area, disassembling the convoy in the first working area, driving in the first working area each single mine vehicle separately at a loading site in order to load rock material, and driving the convoy between the loading site and the unloading site substantially continuously, wherein the slave vehicles are driven unmanned.

* * * * *